F. HUTTENLOCHER & R. LAUFER.
INDICATOR MECHANISM.
APPLICATION FILED MAR. 18, 1913.
1,114,362.
Patented Oct. 20, 1914.
2 SHEETS—SHEET 1.
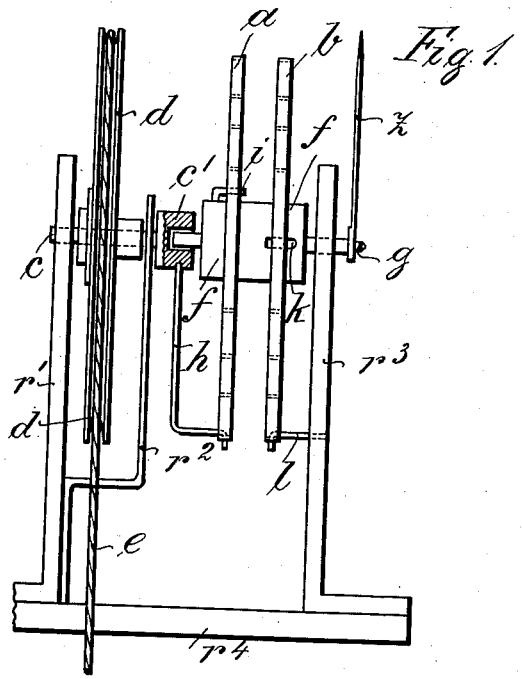
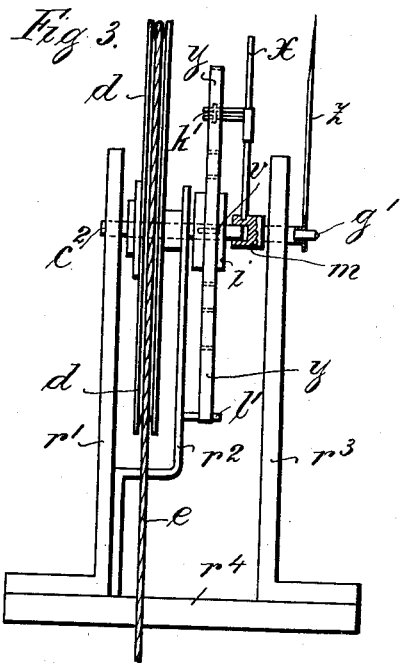
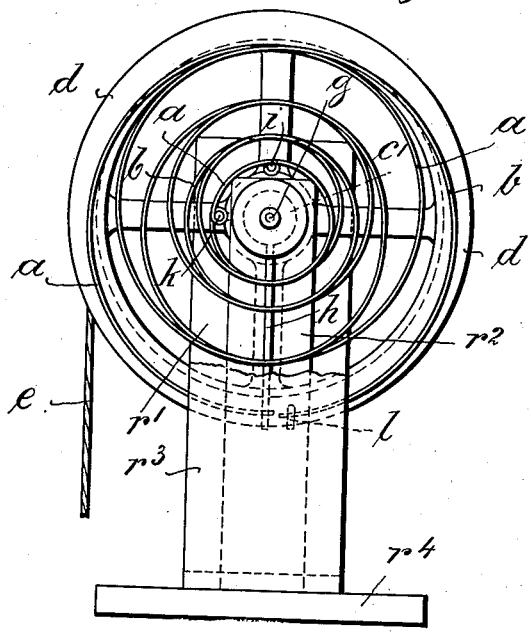
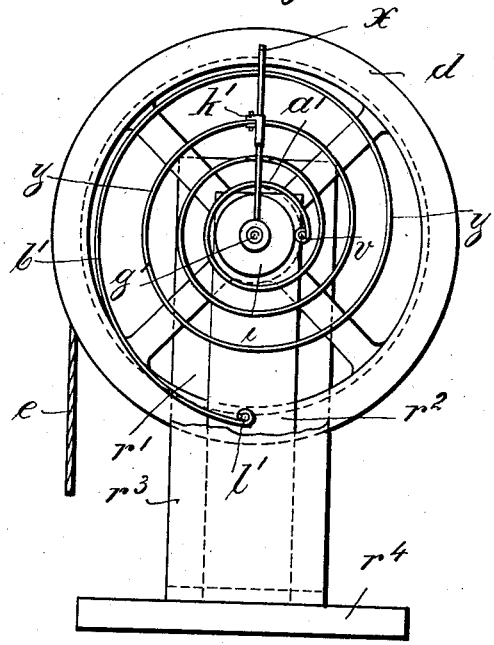
Witnesses:
Charles B Brompton
John A. Percival
Inventor:
Friedrich Huttenlocher
and Rudolf Laufer
by Croydon Marks
Attorney F. HUTTENLOCHER & R. LAUFER.
INDICATOR MECHANISM.
APPLICATION FILED MAR. 18, 1913.
1,114,362.
Patented Oct. 20, 1914.
2 SHEETS—SHEET 2.
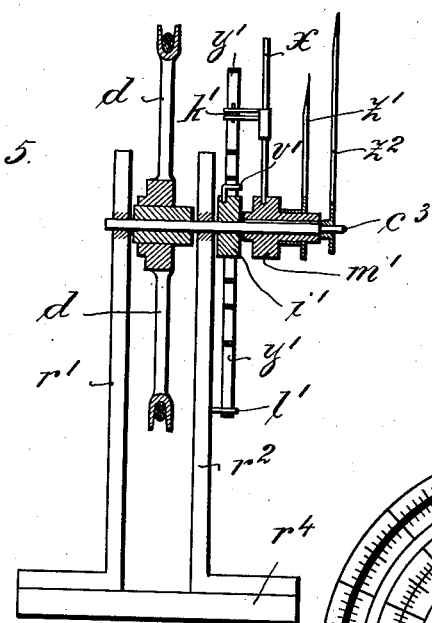
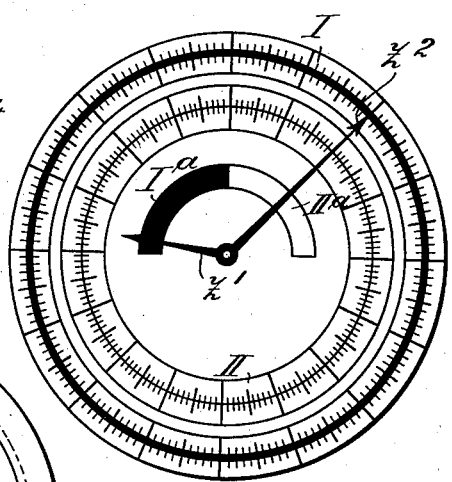
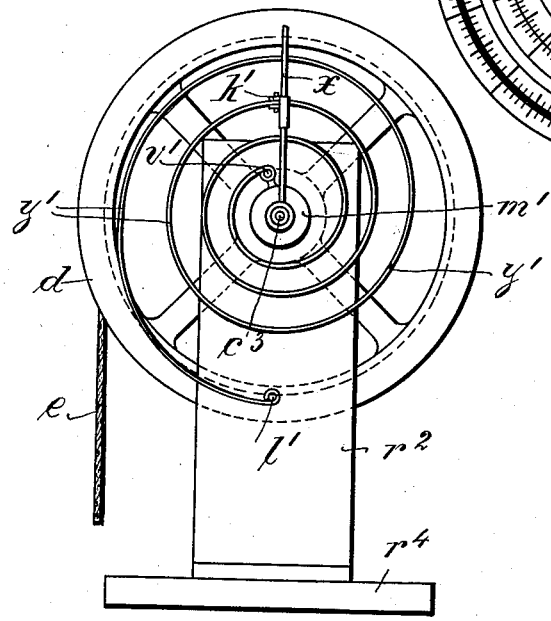
Witnesses:
Charles B Crompton
John A. Brown
Inventor:
Friedrich Huttenlocher
and Rudolf Laufer.
by Croydon Marko
Attorney

UNITED STATES PATENT OFFICE.

FRIEDRICH HUTTENLOCHER, OF CHARLOTTENBURG, AND RUDOLF LAUFER, OF KÖPENICK, NEAR BERLIN, GERMANY.

INDICATOR MECHANISM.

1,114,362.    Specification of Letters Patent.    Patented Oct. 20, 1914.

Application filed March 18, 1913. Serial No. 755,181.

*To all whom it may concern:*

Be it known that we, FRIEDRICH HUTTENLOCHER, a subject of the King of Wurttemberg, residing at Charlottenburg, near Berlin, Germany, and RUDOLF LAUFER, a subject of the Emperor of Austria-Hungary, and residing at Köpenick, near Berlin, Germany, have invented Improvements in Indicator Mechanism, of which the following is a specification.

This invention relates to indicator mechanism and is applicable to indicators of all kinds in which it is desirable that the index describe a movement less than the movement imparted to a driven element by the direct influence of the body or mechanism from which the indications are taken, such, for example, as benzin clocks or indicators used in connection with motor vehicles in which the index of the clock is to describe a movement less than the movement imparted to the float in the benzin reservoir.

The present invention has for its object to dispense with the toothed wheel gearing hitherto usually interposed between the driven element and the index of the indicator, and for this purpose spring mechanism is interposed between the driven element and the index and mounted upon the spindle of the driven element, the spring mechanism being subdivided, preferably into two parts connected at the point intermediate the parts to the index or to a member connected to the index, the two parts of the spring mechanism being connected to the driven element and to a fixed part respectively so that one part of the spring mechanism counteracts the movement of the other part.

In order that the invention may be more clearly understood reference will hereinafter be made to the accompanying drawings which show by way of example various means for carrying out the present invention.

Figure 1 is a side view of one form of our invention and Fig. 2 is a front view of Fig. 1 with the index $g$ and bracket $r^3$ removed. Figs. 3 and 4 are views corresponding to Figs. 1 and 2 respectively showing a modification of the mechanism illustrated in Figs. 1 and 2. Fig. 5 is a vertical section and Fig. 6 a front view of Fig. 5 with the indexes $z^1$ and $z^2$ removed showing a further modification of our invention, and Fig. 7 is a front view showing the graduated dials or disks used in conjunction with the mechanism illustrated in Figs. 5 and 6.

Referring to Figs. 1 and 2 of the drawings: $d$ designates a driven element shown here as comprising a grooved pulley over which is trained a rope or the like $e$ moved under the influence of the body from which the indications are taken, such as the float of a benzin reservoir. The pulley $d$ is fixed upon a spindle $c$ rotatable in corresponding openings or bearings in brackets $r^1$ and $r^2$ supported on a base $r^4$ or otherwise supported in the casing of the indicator mechanism. The spindle $c$ carries a block or collar $c^1$ bored to receive one end of a spindle $g$ and form a bearing therefor, the other end of the spindle $g$ being supported in a bracket $r^3$. Mounted on the front end of the spindle $g$ is an index $z$ and carried by the spindle $g$ is a drum or cylinder $f$ having a hook or other suitable member $i$ connecting the drum $f$ with the inner end of a spiral spring $a$ whose outer end is connected to a rod $h$ depending from the block $c^1$. Adjacent the spiral spring $a$ is a similar spiral spring $b$ likewise surrounding the drum $f$ but wound in the opposite direction thereon and connected at its inner end thereto by means of a hook or the like $k$ on the drum $f$, the outer end of the spring $b$ being secured to a hook or the like $l$ fixed to the bracket $r^3$.

When a pull is exerted upon the rope $e$ the spindle $c$ and rod $h$ are rotated, thus tensioning the spring $i$ which tends to rotate the drum $f$ in the same direction. The rotation of the drum $f$ is, however, retarded by the action of the spring $b$ acting in the opposite direction to the spring $a$ so that the drum $f$, spindle $g$ and index $z$ will describe an angular movement less than that described by the spindle $c$ and pulley $d$, the difference corresponding to the counteracting forces of the springs $a$ and $b$. It will thus be seen that a considerable difference in the movement imparted to the driving pulley $d$ and that imparted to the index $z$ can be attained by suitably proportioning the counteracting forces of the springs $a$ and $b$.

In the modification illustrated in Figs. 3 and 4 a single spring $y$ is employed, this spring being virtually in two parts $a^1$ and $b^1$ by reason of the fact that the spindle $g'$ carrying the index $z$ is connected to the spring $y$ at a point intermediate its ends by a clamp or the like $k^1$ carried by a rod $x$ projecting from a block $m$ on the spindle $g^1$, the block $m$ being bored to receive the end of the spindle $c^2$ on which the pulley $d$ is mounted so that the spindle $g^1$ is capable of independent rotation. In this case the spindle $c^2$ carries a drum or block $i$ around which the spring $y$ is wound and to which the inner end of the spring is connected by a hook or the like $v$. The outer end of the spring $y$ is connected to a hook $l^1$ projecting from the bracket $r^2$. It will thus be seen that the spring $y$ is connected to the index $z$ at a point $k^1$ intermediate the ends $l^1$ and $v$ so that the part $a^1$ of the spring intermediate the connections $v$ and $k^1$ corresponds to the spring $a$ of Fig. 1, while the part $b^1$ of the spring $y$ intermediate the connections $k^1$ and $l^1$ corresponds to the spring $b$. The ratio of the movement transmitted from the pulley $d$ to the index $z$ can in this case be readily varied by adjusting the position of the connection $k^1$ on the spring $y$ or by shortening or lengthening the spring at either the connections $v$ or $l^1$.

The modification illustrated in Figs. 5 and 6 corresponds substantially to the mechanism illustrated in Figs. 3 and 4 except that in this case an additional index $z^2$ is provided mounted on a spindle $c^3$ rotating in unison with the pulley $d$, the spindle $c^3$ in this case carrying a block $i^1$ connected at $v^1$ to the spring $y^1$ which is fixed at $l^1$, as in Figs. 3 and 4, to the bracket $r^2$ and connected intermediate its ends at $k^1$ to the rod $x$ projecting from a block or collar $m^1$ rotatably fitted upon the spindle $c^3$ and carrying the index $z^1$, so that the spring $y$ transmits motion from the pulley $d$ to the index $z^1$ in the manner described with reference to Figs. 3 and 4. In this case two dials over which the indexes $z^1$ and $z^2$ may move are necessary, but for the sake of convenience these dials are not shown in Figs. 5 and 6, but are shown in detail front view in Fig. 7. This arrangement enables large movements of the driven member or pulley $d$ to be indicated on a dial of small diameter. This will be more readily understood by reference to Fig. 7, whereon the index $z^2$ is shown adapted to move over a circular graduated dial carrying separate graduated scales I and II, while the index $z^1$ moves over a dial graduated to indicate upon which of the scales I and II the readings are to be taken. Thus it is possible for the index $z^2$ to make a number of revolutions corresponding to the number of scales over which it moves, the index $z^1$ simultaneously moving to indicate upon which scale the reading of the index $z^2$ is to be taken. Thus in the example illustrated in Fig. 7 the index may describe two revolutions, the scale II constituting a continuation of the scale I.

In Fig. 7 the index $z^1$ is shown adapted to move over a dial having differently colored quadrants I$^a$ and II$^a$, while the scale I is shown correspondingly provided with a circular distinguishing mark corresponding to the color of the quadrant I$^a$. Thus when the index $z^1$ is in the position illustrated in Fig. 7 over the darker colored quadrant I$^a$ the reading of the index $z^2$ is taken from the scale I provided with the circular black line, whereas when the index $z^1$ is over the lighter colored quadrant II$^a$ the readings of the index $z^2$ are taken from the scale II.

We claim:—

1. In an indicator, a driven element, an index, a spring mechanism interposed between said element and index, a connection between said mechanism and element, a second connection between said mechanism and a fixed part, and a third connection between said mechanism and index intermediate said first-mentioned and second connections, whereby the movement imparted by said element through said mechanism to said index is less than the movement of said element.

2. In an indicator; a driven element, an index and a spring mechanism in two-parts and connected intermediate its parts to said index and having its parts connected to said element and to a fixed part respectively.

3. In an indicator; a driven element, a spring connected at one end thereto, an index, a connection between said index and said spring, and spring means for opposing the movement of said connection.

4. In an indicator, a driven element, an index, a spring in two parts and connected intermediate its parts to said index and connected at one end to said driven element and at its other end to a fixed part.

5. In an indicator, a driven element, an index, a spring connected at its ends to said driven element and to a fixed part respectively, and a connection from a point intermediate the ends of said spring to said index.

6. An indicator comprising a rotatably driven spindle, a spring connected at one end to said spindle, an arbor, an index mounted thereon, a connection between said arbor and spring, and spring means for opposing the movement of said connection and arbor.

7. An indicator comprising a rotatably driven spindle, a spring wound thereon and connected at its inner end thereto, said spring being connected at its outer end to a fixed part, an arbor, an index thereon, and a connection from said arbor to a point on said spring intermediate its ends.

8. In an indicator, a driven element, an index, spring mechanism interposed between said element and index and connected thereto so that the movement imparted by said element through said mechanism to said index is less than the movement of said element, and a second index driven directly from said element.

9. In an indicator, a driven element, an index, a spring mechanism in two parts and connected intermediate its parts to said index and having its parts connected to said element and to a fixed part respectively, and a second index driven directly from said element.

10. In an indicator, a driven element, an index, a spring connected at its ends to said driven element and to a fixed part respectively, a connection from a point intermediate the ends of said spring to said index, and a second index driven directly from said element.

11. An indicator comprising a rotatably driven arbor, a spring connected at one end thereto, a member rotatable on said arbor, a slow-movement index on said member, a connection between said member and spring, means for opposing the movement of said connection, and a quick-movement index mounted on said arbor.

12. An indicator comprising a rotatably driven arbor, a spring wound thereon and connected at its inner end thereto and at its outer end to a fixed part, a member rotatable on said arbor, a slow-movement index on said member, a connection between said member and a point on said spring intermediate its ends, and a quick-movement index mounted on said arbor.

13. In an indicator, a driven element, an index, spring mechanism interposed between said element and index and connected thereto so that the movement imparted by said element through said mechanism to said index is less than the movement of said element, a second index driven directly from said element, a dial having a plurality of concentric graduations over which said second index moves and a dial, over which the other index moves, graduated in accordance with the concentric graduations on the other dial.

14. In an indicator, a driven element, an index, a spring mechanism in two-parts and connected intermediate its parts to said index and having its parts connected to said element and to a fixed part respectively, a second index driven directly from said element, a dial having a plurality of concentric graduations over which said second index moves and a dial, over which the other index moves, graduated in accordance with the concentric graduations on the other dial.

15. An indicator comprising a rotatably driven arbor, a spring connected at one end thereto, a member rotatable on said arbor, a slow-movement index on said member, a connection between said member and spring, means for opposing the movement of said connection, a quick-movement index mounted on said arbor, a dial having a plurality of concentric graduations over which said quick-movement index moves and a dial, over which said slow index moves, graduated in accordance with the concentric graduations on the other dial.

16. An indicator comprising a rotatably driven arbor, a spring wound thereon and connected at its inner end thereto and at its outer end to a fixed part, a member rotatable on said arbor, a slow-movement index on said member, a connection between said member and a point on said spring intermediate its ends, a quick-movement index mounted on said arbor, a dial having a plurality of concentric graduations over which said quick-movement index moves and a dial, over which said slow-movement index moves, graduated in accordance with the concentric graduations on the other dial.

In witness whereof we have hereunto set our hands in the presence of two witnesses.

FRIEDRICH HUTTENLOCHER.
RUDOLF LAUFER.

Witnesses:
HENRY HASPER,
WOLDEMAR HAUPT.